(12) United States Patent
Kim et al.

(10) Patent No.: US 10,696,421 B2
(45) Date of Patent: Jun. 30, 2020

(54) ROTUNDA HEIGHT ADJUSTMENT DEVICE FOR BOARDING BRIDGE

(71) Applicant: Korea Airports Corporation, Seoul (KR)

(72) Inventors: Dong Soo Kim, Gimpo-si (KR); Kwang Ho Yang, Seoul (KR); Yon Sang Cho, Busan (KR)

(73) Assignee: Korea Airports Corporation, Seoul (KR)

( * ) Notice: Subject to any disclaimer, the term of this patent is extended or adjusted under 35 U.S.C. 154(b) by 0 days.

(21) Appl. No.: 16/469,609

(22) PCT Filed: Oct. 11, 2017

(86) PCT No.: PCT/KR2017/011176
§ 371 (c)(1),
(2) Date: Jun. 13, 2019

(87) PCT Pub. No.: WO2018/110815
PCT Pub. Date: Jun. 21, 2018

(65) Prior Publication Data
US 2020/0087005 A1    Mar. 19, 2020

(30) Foreign Application Priority Data
Dec. 13, 2016 (KR) .................. 10-2016-0169588

(51) Int. Cl.
*B64F 1/305* (2006.01)
(52) U.S. Cl.
CPC .................... *B64F 1/305* (2013.01)

(58) Field of Classification Search
CPC ...................................................... B64F 1/305
(Continued)

(56) References Cited

U.S. PATENT DOCUMENTS 3,808,626 A * 5/1974 Magill .................. B64F 1/3055
14/71.5
4,319,376 A * 3/1982 Saunders ................ B64F 1/305
138/120
(Continued)

FOREIGN PATENT DOCUMENTS

JP    H05131901 A    5/1993
KR    20-0431312 Y1    11/2006
(Continued)

OTHER PUBLICATIONS

WIPO, Korean International Search Authority, International Search Report and Written Opinion dated Jan. 17, 2018 in International Patent Application No. PCT/KR2017/011176, 9 pages.

*Primary Examiner* — Raymond W Addie
(74) *Attorney, Agent, or Firm* — Inskeep IP Group, Inc.

(57) ABSTRACT

A height adjustment device for adjusting a rotunda of a boarding bridge includes an external column fixed to the ground and having an inner space formed therein; an internal column which fixes a rotunda, and which is coupled so as to be slidable in the inner space such that rising and lowering is enabled; a driving unit which makes the internal column move vertically with respect to external column, and is disposed between the to the outside of the external column and the internal column; and a power unit for controlling the driving unit. The rotunda height adjustment device can be inspected, repaired for a defect thereof, and easily replaced.

9 Claims, 6 Drawing Sheets

(58) Field of Classification Search
USPC .......................................................... 14/71.5
See application file for complete search history.

(56) References Cited

U.S. PATENT DOCUMENTS

| | | | |
|---|---|---|---|
| 4,852,197 A * | 8/1989 | Thomas, Jr. .......... | B64F 1/3055 14/71.5 |
| 5,004,188 A * | 4/1991 | Donneky .............. | B64F 1/3055 244/137.2 |
| 5,084,936 A * | 2/1992 | Thomas, Jr. ............ | B64F 1/305 14/71.5 |
| 6,704,963 B1 * | 3/2004 | Hutton .................... | B64F 1/305 14/71.5 |
| 9,630,728 B2 * | 4/2017 | Kim ...................... | B64F 1/3055 |

FOREIGN PATENT DOCUMENTS

| KR | 20130123997 A | 11/2013 |
|---|---|---|
| KR | 101369328 B1 | 3/2014 |
| KR | 101524235 B1 | 5/2015 |

\* cited by examiner

ROTUNDA HEIGHT ADJUSTMENT DEVICE FOR BOARDING BRIDGE

RELATED APPLICATIONS

This application is the U.S. National Phase of and claims priority to International Patent Application No. PCT/KR2017/011176, International Filing Date Oct. 11, 2017, entitled Rotunda Height Adjustment Device For Boarding Bridge; which claims benefit of Korean Patent Application No. KR10-2016-0169588 filed Dec. 13, 2016; both of which are incorporated herein by reference in their entireties.

BACKGROUND OF THE INVENTION

Example embodiments relate to a rotunda height adjusting device of a boarding bridge, and more particularly, to a rotunda height adjusting device of a boarding bridge that may facilitate inspection, repair and maintenance, and replacement because a drive unit of the rotunda height adjusting device is to be installed so as to be exposed to an outside.

Description of Related Art

A boarding bridge refers to a mechanical bridge for transferring passengers between an airplane and a passenger terminal at an airport passenger terminal. Since a height of an entrance is different for each type or model of airplane, a rotunda may be provided to adjust a height and an inclination of the boarding bridge to be suitable for a corresponding entrance of an airplane. In such a case, a stationary tunnel may be installed from the passenger terminal to the rotunda, and a movable tunnel and a movable boarding bridge may be installed from the rotunda to the airplane.

To adjust a height of the rotunda, a rotunda column may be installed to support the rotunda from the ground and adjust ascent and descent of the rotunda. The rotunda column may include a height adjusting device configured to adjust its height by itself.

A general type of device for adjusting a height of the rotunda column may be provided as a ball screw type or a hydraulic drive unit, and such device may be disposed inside the column. In such a case, when assembling the rotunda and the column which are relatively heavy, internal parts thereof may be damaged due to an impact between the parts. In addition, a great amount of time may need to be used for the assembling, and thus production and installation may not be readily performed.

In addition, in the event of repair and maintenance, or failure, a great amount of work may be needed to disassemble the rotunda column, and thus there may be an issue in terms of cost and time.

Moreover, it may not be easy to perform inspection, repair and maintenance, and replacement, while the rotunda height adjusting device is operating.

Based on what has been described above, there is a desire for a rotunda height adjusting device of which a drive unit is exposed to an outside, facilitating inspection, repair and maintenance, and replacement.

BRIEF SUMMARY OF THE INVENTION

An aspect provides a rotunda height adjusting device of a boarding bridge. The rotunda height adjusting device may be installed such that a drive unit thereof is exposed to an outside, and thus the rotunda height adjusting device may be more readily produced and installed.

An aspect also provides a rotunda height adjusting device of a boarding bridge. The rotunda height adjusting device may be installed so as to be observable from an outside, and thus it is possible to observe the rotunda height adjusting device even in the middle of its operation, thereby facilitating inspection, and repair and maintenance during the operation.

An aspect also provides a rotunda height adjusting device of a boarding bridge. The rotunda height adjusting device may not require disassembling of a tunnel and a column for inspection, repair and maintenance, and replacement.

An aspect also provides a rotunda height adjusting device of a boarding bridge. The rotunda height adjusting device may include a plurality of drive units and some of the drive units may selectively operate, and it is thus possible to replace some of the drive units, for example, a portion of ¾ of the drive units, while the rotunda height adjusting device is operating.

An aspect also provides a rotunda height adjusting device of a boarding bridge that may adjust a height of a rotunda in advance based on a model of an airplane to be connected to the boarding bridge.

According to an example embodiment, there is provided a rotunda height adjusting device of a boarding bridge, including an external column fixed to a ground and having an inner space formed therein, an internal column configured to fix a rotunda, and coupled so as to be slidable in the inner space to ascend and descend, a drive unit configured to allow the internal column to ascend and descend with respect to the external column and provided so as to be exposed to an outside of the external column and the internal column, a power unit configured to operate the drive unit, and a control panel provided in the external column and configured to control the power unit.

The internal column may have a T-shaped front face, and include a vertical column configured to be inserted into the inner space, and a horizontal column attached to an upper face of the vertical column, with the drive unit being attached to an edge of a lower end of the horizontal column.

The internal column may further include a distance sensor configured to measure a distance between the horizontal column and the external column, The inner space may include a plurality of divided spaces, and a plurality of rotating rollers may be provided in the divided spaces, The rotating rollers may be disposed in a motion direction in which the internal column moves.

The drive unit may be provided as a plurality of drive units, and a portion of the drive units may be configured to operate selectively.

In addition, a portion of the drive units may be replaceable during an operation.

The power unit may receive internal data based on a flight schedule, and automatically control a height of the rotunda by referring to a model of an airplane.

When the internal column moves by a length greater than or equal to a preset length by the drive unit, the power unit may be configured to restrict the movement.

Through such a structure described above, the drive unit may be provided as a plurality of drive units so as to be exposed to an outside, and thus it is possible to readily perform inspection, repair and maintenance, and replacement works and also perform such works even when the rotunda height adjusting device is operating.

According to another example embodiment, there is provided a rotunda height adjusting system including a control panel configured to communicate with a power unit of each of rotunda height adjusting devices of boarding bridges, a supervisory control computer configured to communicate with the control panel and configured to monitor and control power units individually, and a flight schedule management computer configured to communicate with the supervisory control computer, and refer to and manage a flight schedule.

According to example embodiments described herein, a drive unit of a rotunda height adjusting device may be installed outside, and it is thus possible to facilitate production and installation.

According to example embodiments described herein, a tunnel and a column do not need to be disassembled to perform inspection, and repair and maintenance.

According to example embodiments described herein, it is possible to immediately perform inspection, and repair and maintenance because a drive unit is installed so as to be exposed to an outside.

According to example embodiments described herein, it is possible to perform inspection, and repair and maintenance while a rotunda height adjusting device is operating.

According to example embodiments described herein, a plurality of drive units may be installed and some of them may selectively operate, and it is thus possible to replace some of the drive units, for example, a portion of ¾ of the drive units, while a rotunda height adjusting device is operating.

According to example embodiments described herein, it is possible to adjust a height of a rotunda in advance based on a type or model of an airplane to be connected to a boarding bridge such that the height of the rotunda corresponds to a height of an entrance of the airplane.

According to example embodiments described herein, it is possible to smoothly perform installation, inspection, and repair and maintenance work, and thus extend a service life of equipment.

DETAILED DESCRIPTION

Figure 6:
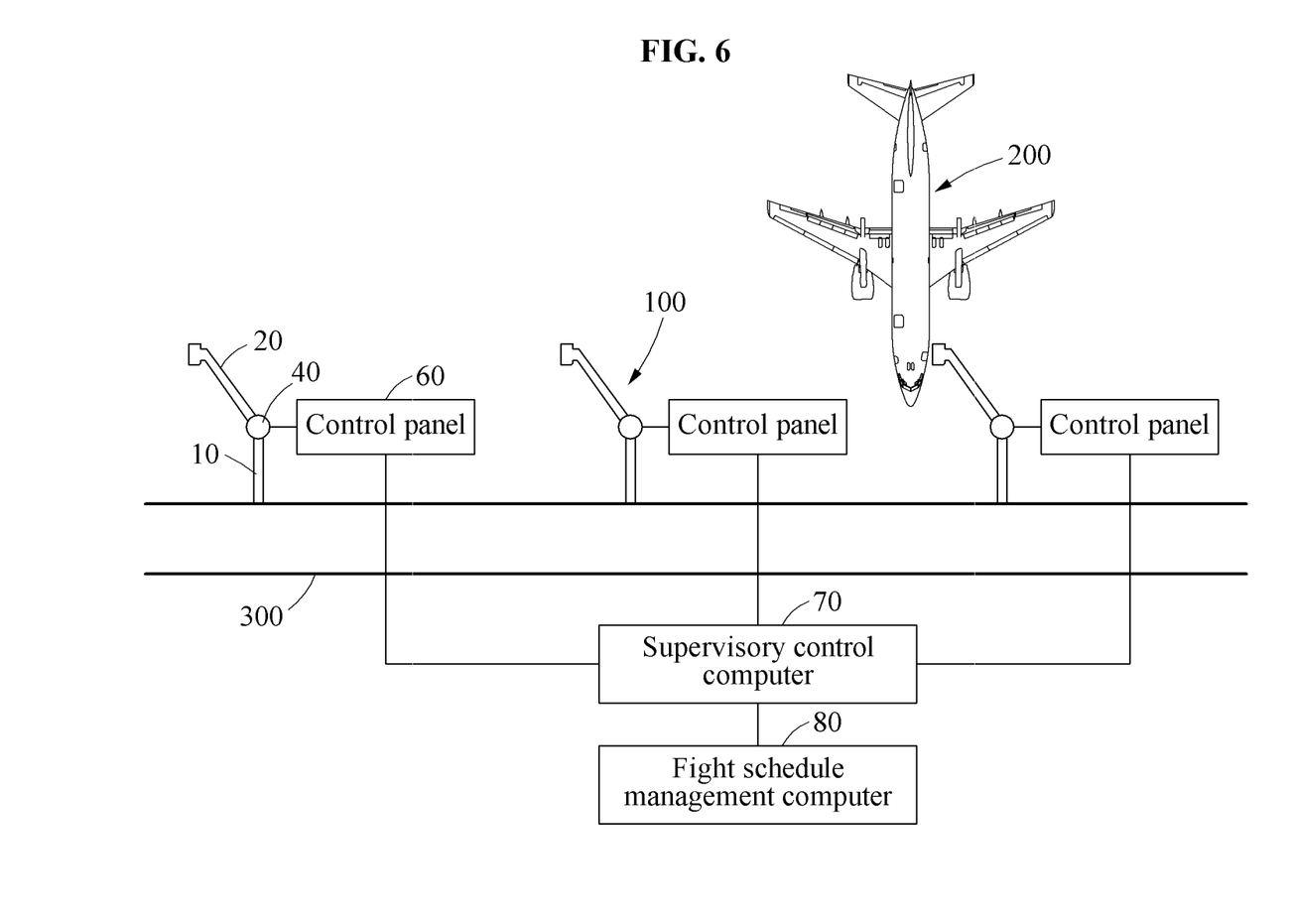
FIG. 6 is a diagram illustrating a rotunda height adjusting system for adjusting heights of boarding bridges connected to a passenger terminal.

A passenger terminal 300 illustrated in FIG. 6 at an airport is connected to a plurality of boarding bridges 100, and is thus to be connected to an entrance of an airplane 200. A boarding bridge includes a rotunda 30, a stationary tunnel 10, and a movable tunnel 20.

Hereinafter, the rotunda 30 of a general type will be described.

The rotunda 30 is connected to the stationary tunnel 10 connected to the passenger terminal 300, and the movable tunnel 20 is disposed between the rotunda 30 and an airplane.

Here, the rotunda 30 includes a rotunda height adjusting device 40 to adjust a height of the rotunda 30 such that the rotunda 30 is to be connected to an entrance of an airplane at a location and height of a cabin on the side of the movable tunnel 20.

Figure 1:
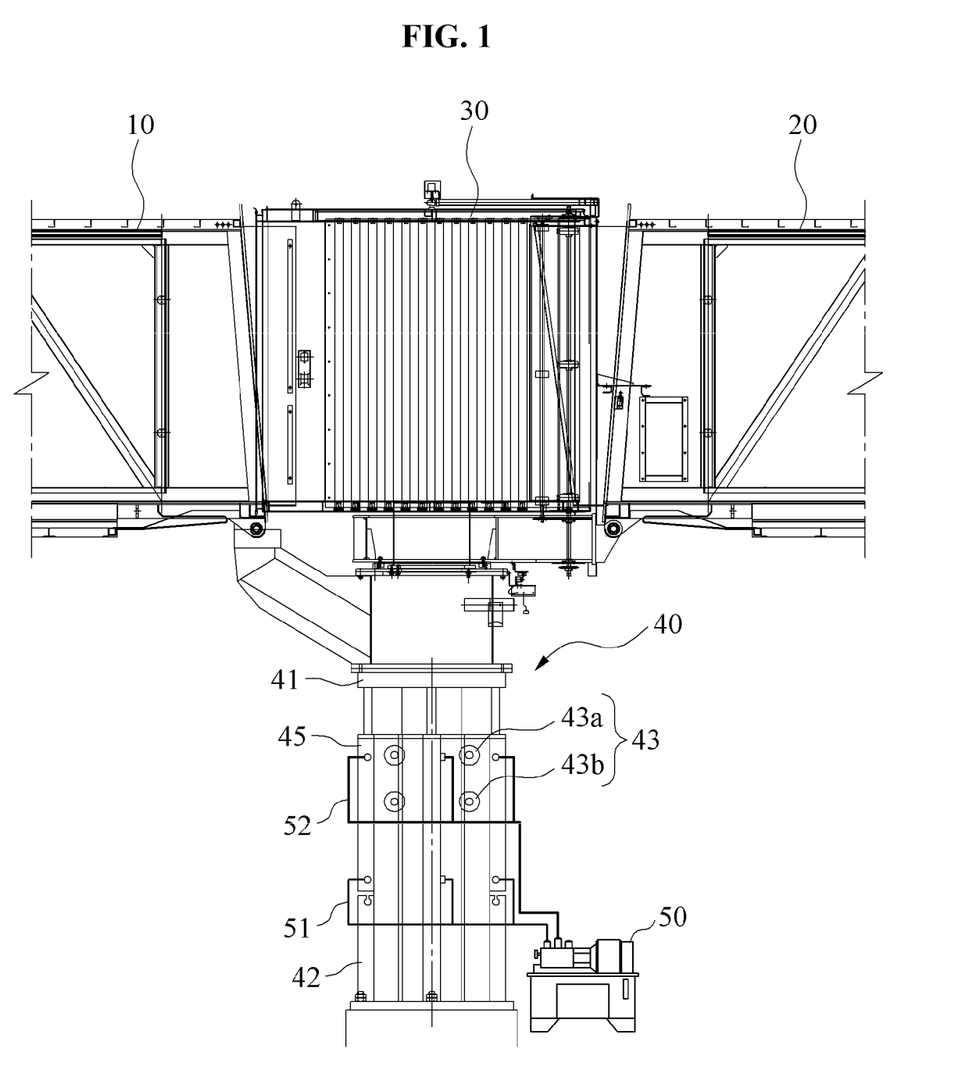
FIG. 1 is a front view of a boarding bridge including a rotunda height adjusting device.

FIG. 1 is a front view of a boarding bridge including a rotunda height adjusting device 40 according to an example embodiment.

Referring to FIG. 1, the rotunda height adjusting device 40 includes an external column 42, an internal column 41, and a plurality of rotating rollers 43, a drive unit 45, and a power unit 50.

The external column 42 is fixed to a surface of the ground and has an inner space 44 formed therein, and is disposed such that the internal column 41 is to be inserted into the inner space 44 and operates vertically. The external column 42 will be described in greater detail hereinafter with reference to FIG. 2.

The internal column 41 is inserted in the inner space 44 of the external column 42 to operate or move vertically, and attached to a lower end of the rotunda 30 to fix the rotunda 30 and allow the rotunda 30 to operate or move vertically. The internal column 41 will be described in greater detail hereinafter with reference to FIG. 3.

The rotating rollers 43 are provided in the inner space 44, and installed in a vertical motion direction to support a vertical motion of the internal column 41 in the inner space 44. The rotating rollers 43 will be described in greater detail hereinafter with reference to FIG. 2.

The drive unit 45 is configured to allow the internal column 41 to move vertically with respect to the fixed external column 42, and installed so as to be exposed to an outside of the external column 42 and the internal column 41.

Although the drive unit 45 may be formed as a hydraulic cylinder as illustrated in FIGS. 1 through 4, various devices that allow the internal column 41 to ascend and descend with respect to the fixed external column 42, for example, a pneumatic cylinder, a screw jack, and an electrically-powered lift, may also be used.

The power unit 50 is configured to provide power to the drive unit 45, and control an ascending or descending motion of the internal column 41.

For example, when the drive unit 45 is a hydraulic cylinder, the power unit 50 may include a hydraulic power unit configured to provide a hydraulic driving power to the hydraulic cylinder, and include an ascending output pipe 52 and a descending output pipe 51 that are connected to the hydraulic cylinder.

Through such structure described in the foregoing, the power unit 50 may allow the hydraulic cylinder to ascend through the ascending output pipe 52, and the hydraulic cylinder may move the internal column 41 upwards with respect to the external column 42.

Similarly, the power unit 50 may allow the lifted hydraulic cylinder to descend through the descending output pipe 51, and the hydraulic cylinder may move the internal column 41 downwards with respect to the external column 42.

In addition, when the internal column 41 moves by a length greater than or equal to a preset length, the power unit 50 is configured to restrict such movement. For example, a height by which the internal column 41 ascends may be restricted based on an ascending height value preset by the power unit 50. Conversely, a height by which the internal column 41 descends may be restricted based on a descending height value preset by the power unit 50.

As described above, the internal column 41 is to be inserted in the inner space 44 of the external column 42, and is thus coupled thereto so as to be moveable. The internal column 41 is configured to ascend or descend by the drive unit 45 while being in contact with the rotating rollers 43 provided in the inner space 44. The power unit 50 is configured to provide driving power to the drive unit 45 and control an ascending or descending motion. The structure described in the foregoing will be described in greater detail hereinafter with reference to FIGS. 2 through 4.

Figure 2:
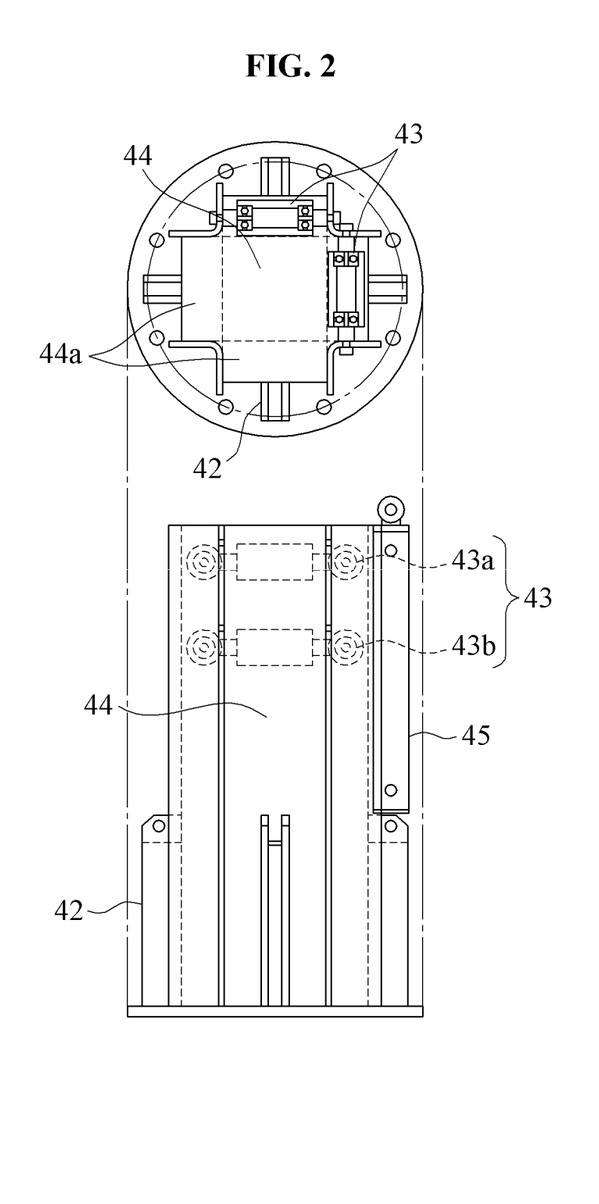
FIG. 2 is a diagram illustrating an external column.

FIG. 2 is a diagram illustrating the external column 42.

Referring to FIG. 2, to one outer side of the external column 42, the drive unit 42 is connected. For example, the drive unit 45 may include a plurality of hydraulic cylinders installed along an outer circumference of the external column 42 at regular intervals so as to be exposed to an outside.

In addition, the external column 42 includes a control panel 60 on an outer surface thereof to control the power unit 50. The control panel 60 will be described in greater detail hereinafter with reference to FIG. 4.

The external column 42 has the inner space 44 extending in a direction in which the internal column 41 ascends and descends. For example, the inner space 44 is formed such that the internal column 41 is inserted therein, and formed in a V shape when observed from top as illustrated in FIG. 2. For example, the inner space 44 has a plurality of divided spaces 44a formed in edge portions excluding a center portion into which the internal column 41 is to be inserted.

In the divided spaces 44a, the rotating rollers 43 are installed. For example, the rotating rollers 43 may be supported so as to be rotatable in the divided spaces 44a, and installed so as to be rotatable while being in contact as the internal column 41 moves upwards or downwards.

In this example, the rotating rollers 43 may be installed to surround a circumference of the internal column 41 such that the internal column 41 stably moves upwards or downwards while the rotating rollers 43 are in contact with the internal column 41.

In addition, the rotating rollers 43 include a first rotating roller 43a installed on an upper side of the divided spaces 44a, and a second rotating roller 43b installed below the first rotating roller 43a, along a motion direction of the internal column 41.

When the internal column 41 moves in an ascending and descending direction in the inner space 44, the first rotating roller 43a and the second rotating roller 43b function as a guide for motion or movement in the ascending and descending direction while fixing the internal column 41 not to be tilted or swayed.

As described above, the external column 42 has the inner space 44 divided into the divided spaces 44a in which the rotating rollers 43 are rotatably installed. The rotating rollers 43 include the first rotating roller 43a and the second rotating roller 43b which are installed in an area divided into two spaces in the inner space 44 along a motion direction of the internal column 41. Thus, the internal column 41 is supported not to be tilted or swayed as it ascends or descends.

Figure 3:
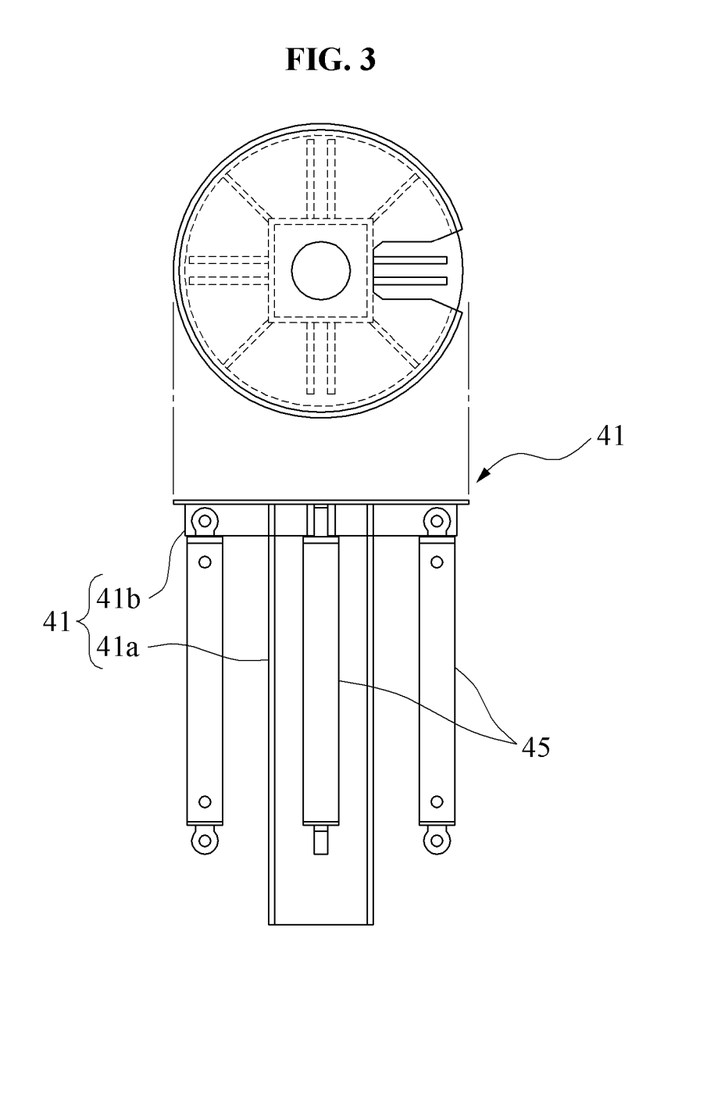
FIG. 3 is a diagram illustrating an internal column.

FIG. 3 is a diagram illustrating the internal column 41.

Referring to FIG. 3, the internal column 41 performs an ascending and descending motion through the drive unit 45 while it is being inserted in the inner space 44 of the external column 42. For example, as illustrated, the internal column 41 includes a vertical column 41a, a horizontal column 41b, and a distance sensor 411.

The vertical column 41a is a portion of the internal column 41 that extends in a vertical direction, and is to be inserted into the inner space 44 of the external column 42. An outer surface thereof is in contact with the rotating rollers 43.

The horizontal column 41b is attached to cover an upper surface of the vertical column 41a, and a diameter thereof is set to be greater than that of the vertical column 41a. To an edge of a lower end thereof, the drive unit 45 is connected in a vertical direction.

The distance sensor 411 is installed on the horizontal column 41b, and configured to measure a distance between the internal column 41 and the external column 42. The distance sensor 411 will be described in greater detail hereinafter with reference to FIG. 5.

As described above, the internal column 41 includes the vertical column 41a to be inserted into the inner space 44 and the horizontal column 41b attached to the upper surface of the vertical column 41a. When observed from the front, the vertical column 41a and the horizontal column 41b are combined in a T shape. The drive unit 45 is attached to the horizontal column 41b.

The drive unit 45 may include a hydraulic cylinder which may be connected to each edge of the external column 42 and the horizontal column 41b through hinged connection and may be provided as a plurality of hydraulic cylinders disposed at regular intervals along a circumference of each edge.

Figure 4:
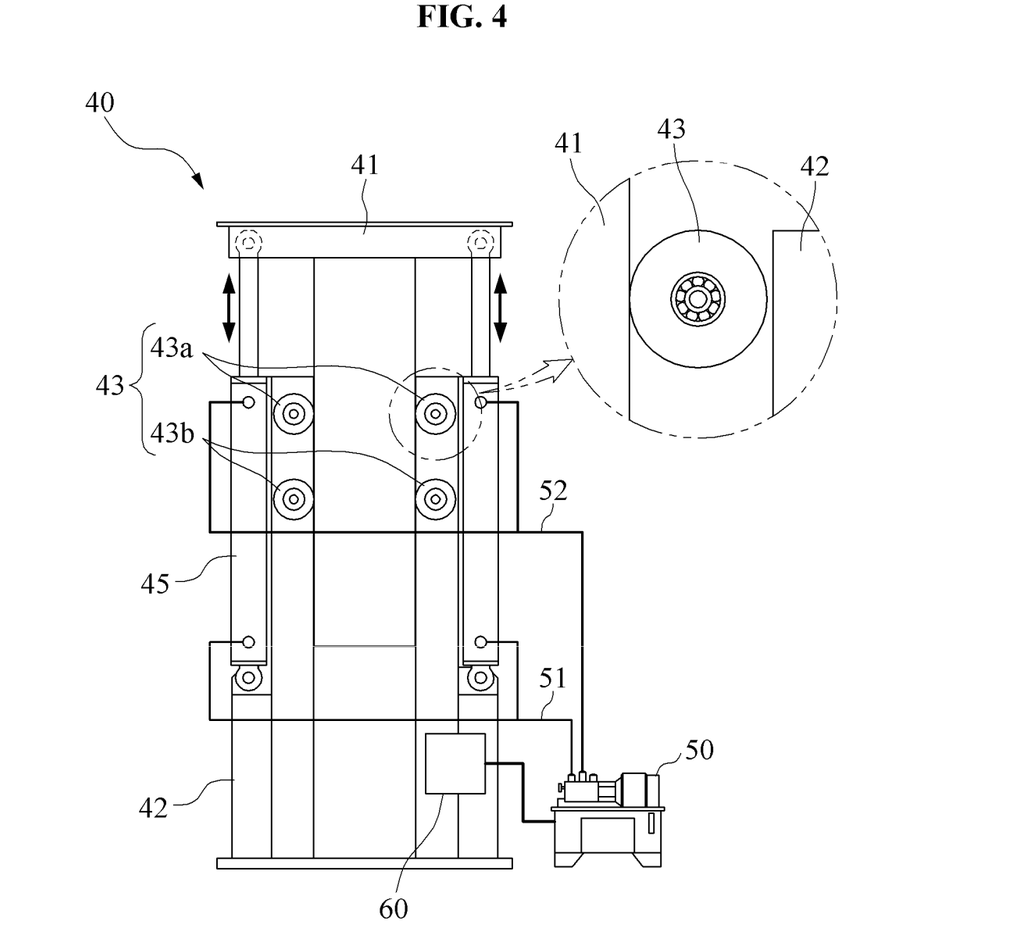
FIG. 4 is a diagram illustrating a vertical operation of a rotunda height adjusting device of a boarding bridge.

FIG. 4 is a diagram illustrating a vertical operation of a rotunda height adjusting device of a boarding bridge.

As illustrated in FIG. 4, an edge of the external column 42 and an edge of the internal column 41 are connected through the drive unit 45 which is provided as a plurality of drive units disposed separately at regular intervals along a circumference of the edges.

Through such structure, the drive unit 45 is provided so as to be exposed to an outside of the internal column 41 and the external column 42. As the power unit 50 actuates the drive unit 45, while one end of the drive unit 45 is being fixed to the external column 42, the drive unit 45 is configured to allow the internal column 41 connected to another end of the drive unit 45 to ascend or descend. Thus, the internal column 41 performs an ascending and descending motion while being in contact with the rotating rollers 43 provided in the inner space 44, and thus adjust a height of the rotunda 30 supported by the internal column 41.

The drive unit 45 is installed so as to be exposed to an outside, and it is thus possible to inspect the drive unit 45 while the rotunda height adjusting device 40 is operating.

For example, in a case in which the drive unit 45 is provided as a plurality of drive units, the rotunda height adjusting device 40 may operate even when some of the drive units 45 operates selectively. In this example, the rotunda height adjusting device 40 may operate when at least ¾ or more of the drive units 45 operates.

Through the drive units 45, it is possible to replace a portion of the drive units 45 while the rotunda height adjusting device 40 is operating. For example, when a drive unit to be replaced among the drive units 45 is operating, by switching the drive unit to be replaced to be in an idle state and switching another drive unit that is previously in an idle state to be in an operating state, it is possible to replace the drive unit that is currently switched to be in the idle state.

In this example, when the drive unit to be replaced is in an idle state, it is possible to replace the drive unit immediately.

The control panel 60 refers to a circuit panel including instrumental or gauging elements, and switches to control the power unit 50, and is connected to the power unit 50 to control the power unit 50 and adjust a height of the rotunda 30. For example, the control panel 60 is provided on an outer surface of the external column 42 as illustrated in FIG. 4, and may also be externally provided outside the external column 42.

In addition, the control panel 60 is configured to receive, in real time, internal data of airplane flight schedule of an airport by wire or wirelessly, refer to a model of an airplane in real time, and control the power unit 50 and automatically control a height of the internal column 41 such that a height of the rotunda 30 is adjusted to correspond to a height preset for a model of each airplane.

Figure 5:
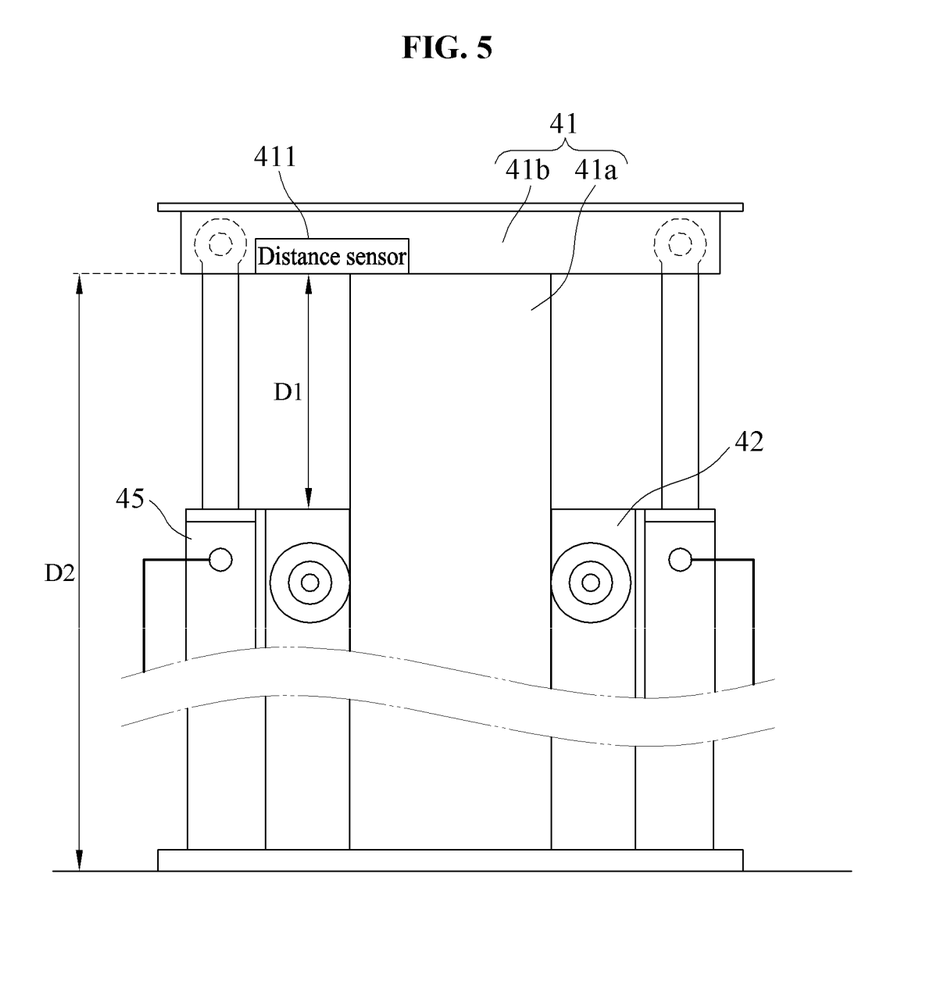
FIG. 5 is a diagram illustrating a distance sensor provided in an internal column.

FIG. 5 is a diagram illustrating a distance sensor provided in an internal column.

The distance sensor 411 is installed at an edge of a lower side of the horizontal column 41*b* as illustrated in FIG. 5. The distance sensor 411 measures a distance from a lower surface or a bottom of the horizontal column 41*b* to a reference surface of one side of the external column 42.

For example, as illustrated, the distance sensor 411 measures a distance D1 from the lower surface of the horizontal column 41*b* to an upper surface or a top of the external column 42, or a distance D2 from the lower surface of the horizontal column 41*b* to the ground. Through this, it is possible to measure a height of the rotunda 30 of the boarding bridge 100.

The distance sensor 411 may be, for example, an infrared distance sensor, and configured to communicate with the control panel 60 and adjust a height to be desirable through the power unit 50.

FIG. 6 is a diagram illustrating a rotunda height adjusting system for adjusting heights of boarding bridges connected to a passenger terminal.

Referring to FIG. 6, a boarding bridge 100 is provided as a plurality of boarding bridges connected to a passenger terminal 300. A rotunda adjusting device 40 is provided in each of the boarding bridges 100, and includes a power unit 50 and a control panel 60.

Herein, power units 50 provided in respective rotunda adjusting devices 40 of the boarding bridges 100 are connected to respective control panels 60 to be directly controlled thereby. The control panels 60 are connected to a supervisory control computer 70 through a network to enable communication therebetween.

For example, each control panel 60 is configured to communicate, by wire or wirelessly, with the supervisory control computer 70 provided in a central monitor room of an airport. The supervisory control computer 70 is configured to detect a height of a rotunda 30 of the boarding bridges 100 connected to the passenger terminal 300 and individually control the power units 50 through the control panels 60.

In addition, the supervisory control computer 70 is connected, by wire or wirelessly, to a flight schedule management computer 80, and configured to communicate with the flight schedule management computer 80 and receive flight schedule data to determine a model of an airplane to be connected to each of the boarding bridges 100 connected to the passenger terminal 300.

Thus, the supervisory control computer 70 is configured to individually control the power units 50 corresponding to the boarding bridges 100, and adjust the height of the rotunda 30 of the boarding bridges 100 connected to the passenger terminal 300 to correspond to a height of an entrance of an airplane 200 scheduled to be landed thereon as illustrated.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A rotunda height adjusting device of a boarding bridge, comprising:
   an external column fixed to a ground and having an inner space formed therein;
   an internal column configured to fix a rotunda, and coupled so as to be slidable in the inner space to ascend and descend;
   at least one drive unit configured to allow the internal column to ascend and descend with respect to the external column, and provided so as to be exposed to an outside of the external column and the internal column; and
   a power unit configured to provide power to the drive unit and control the drive unit,
      wherein the at least one drive unit is disposed adjacent to a circumference of the external column and configured to allow a vertical operation,
      the inner space comprises a plurality of divided empty spaces in an outer part excluding a central part into which the internal column is to be inserted, and
      a plurality of rotating rollers to be in contact with the internal column is provided in the divided spaces,
      wherein the rotating rollers comprise:
         a first rotating roller provided in an upper side of the divided spaces oriented in a motion direction in which the internal column moves; and
         a second rotating roller provided below the first rotating roller in the divided spaces oriented in a motion direction in which the internal column moves.

2. The rotunda height adjusting device of claim 1, wherein the drive unit is configured to operate by a hydraulic pressure.

3. The rotunda height adjusting device of claim 1, wherein the drive unit is provided as a plurality of drive units,
   wherein a portion of the drive units is configured to operate selectively.

4. The rotunda height adjusting device of claim 3, wherein, when the portion of the drive units is operating selectively, a remaining portion of the drive units that is not operating is replaceable.

5. The rotunda height adjusting device of claim 1, further comprising:
   a control panel connected to the power unit and configured to control the power unit,
      wherein the internal column has a T-shaped front face, and comprises:

a vertical column configured to be inserted into the inner space; and a horizontal column attached to an upper face of the vertical column, with the drive unit being attached to an edge of a lower end of the horizontal column.

6. The rotunda height adjusting device of claim 5, wherein the internal column further comprises:

a distance sensor configured to measure a distance between a lower face of the horizontal column and the ground, or a relative distance between the internal column and the external column, wherein the distance sensor is configured to communicate with the control panel.

7. The rotunda height adjusting device of claim 5, wherein, when the internal column moves by a length greater than or equal to a preset length by the drive unit, the power unit is configured to restrict the movement.

8. The rotunda height adjusting device of claim 7, wherein the control panel is configured to receive internal data based on a flight schedule by communicating with a flight schedule management computer, and automatically control the power unit by referring to a model of airplane in real time, to adjust a height of the rotunda.

9. A rotunda height adjusting system configured to control a plurality of rotunda height adjusting devices provided to a plurality of boarding bridges connected to a passenger terminal, wherein each of the rotunda height adjusting devices is configured to adjust a height of a rotunda and comprises:

an external column fixed to a ground and having an inner space formed therein;

an internal column configured to fix the rotunda, and coupled so as to be slidable in the inner space to ascend and descend;

a drive unit configured to allow the internal column to ascend and descend with respect to the external column, provided so as to be exposed to an outside of the external column and the internal column, disposed adjacent to a circumference of the external column, and configured to allow a vertical operation;

a first rotating roller portion provided so as to be in contact with the internal column at a circumference of an upper side of the inner space;

a second rotating roller portion provided so as to be in contact with the internal column at a circumference of a lower side of the first rotating roller portion;

a power unit configured to provide power to the drive unit and control the drive unit; and a control panel connected to the power unit and configured to control the power unit, the rotunda height adjusting system comprising:

a supervisory control computer configured to communicate with the control panel provided in each of the rotunda height adjusting devices, and individually monitor and control respective power units of the rotunda height adjusting devices; and a flight schedule management computer configured to communicate with the supervisory control computer, and refer to and manage a flight schedule, wherein the supervisory control computer is configured to receive the flight schedule from the flight schedule management computer, and control in advance a power unit of a rotunda height adjusting device of a boarding bridge to which an airplane is to be connected, such that a height of the rotunda is adjusted to correspond to a height of an entrance of the airplane.

* * * * *